(12) United States Patent
Chen et al.

(10) Patent No.: US 7,518,767 B2
(45) Date of Patent: Apr. 14, 2009

(54) SCANNING MODULE MOVEMENT PROCESS AND GUIDING STRUCTURE THEREFOR

(76) Inventors: Shih-Huang Chen, No. 12, Lane 206, Hsin-Chuang St., Hsinchu (TW); Yin-Chun Huang, 6F, No. 72-11, Lane 531, Sec. 1, Kuang-Fu Rd., Hsinchu (TW)

( * ) Notice: Subject to any disclaimer, the term of this patent is extended or adjusted under 35 U.S.C. 154(b) by 902 days.

(21) Appl. No.: 10/695,022

(22) Filed: Oct. 27, 2003

(65) Prior Publication Data

US 2004/0085596 A1    May 6, 2004

(30) Foreign Application Priority Data

Oct. 25, 2002    (TW) .................... 91125115 A

(51) Int. Cl.
*H04N 1/04*    (2006.01)
(52) U.S. Cl. ........................ 358/497; 358/474
(58) Field of Classification Search .......... 358/497, 358/493, 474, 505, 483, 482, 512–514; 250/208.1, 250/239, 234–236; 399/211; 382/312, 318, 382/319
See application file for complete search history.

(56) References Cited

U.S. PATENT DOCUMENTS

| 6,141,119 | A | * | 10/2000 | Tseng et al. | 358/498 |
| 6,323,963 | B1 | * | 11/2001 | Takahashi | 358/474 |
| 6,721,074 | B1 | * | 4/2004 | Kao | 358/496 |
| 6,785,024 | B1 | * | 8/2004 | Corby et al. | 358/474 |
| 2004/0027620 | A1 | * | 2/2004 | Tseng | 358/474 |
| 2004/0140605 | A1 | * | 7/2004 | Tseng | 271/3.05 |

\* cited by examiner

*Primary Examiner*—Cheukfan Lee
(74) *Attorney, Agent, or Firm*—Stolowitz Ford Cowger LLP

(57) ABSTRACT

A scanning apparatus of the invention comprises a scanning module that is slidably mounted to a guiding structure, and a scanning platform where is placed a document sheet to be scanned. The guiding structure includes a first track portion and a second track portion that oppositely face the scanning platform. Thereby when the scanning module is located on the first track portion, it captures the image of the front side of the document sheet. When the scanning module is located on the second track portion, it captures the image of the reverse side of the document sheet.

20 Claims, 3 Drawing Sheets

SCANNING MODULE MOVEMENT PROCESS AND GUIDING STRUCTURE THEREFOR

CROSS-REFERENCE TO RELATED APPLICATION

This application claims the priority benefit of Taiwan application Ser. NO. 91125115, filed on Oct. 25, 2002.

BACKGROUND OF THE INVENTION

1. Field of the Invention

The invention relates generally to scanning apparatus technology and, more particularly, to a method of scanning both sides of a document sheet by means of a scanning module.

2. Description of the Related Art

Current scanning apparatuses increasingly become more popular as their commercial prices are substantially reduced and their performances enhanced. More particularly, a current scanning apparatus is capable of scanning larger document sheets with a higher image resolution by means of an IEEE 1394 transmission interface. Conventionally, a scanning apparatus can be distinguished among different types such as a handheld scanning apparatus, a sheet feed scanning apparatus, a flatbed scanning apparatus, an overhead scanning apparatus, and a positive/negative scanning apparatus.

A sheet feed scanning apparatus may be assembled with an automatic document feeder (ADF) that includes an inlet slot through which the document sheet is inserted. Through an assembly of rollers and wheels, the document sheet then is fed in the scanning apparatus to be scanned. To further enhance the performance of the scanning apparatus, a flipping device may be additionally mounted in the automatic document feeder to turn the document sheet for capturing the images of both front and reverse sides of the document sheet. The ADF is usually placed on the scanning platform or in the upper cover of the flatbed scanning apparatus.

The design of a conventional ADF is generally complex, and the document sheet fed in the inlet slot may be subjected to jam problems. Moreover, when the scanning apparatus performs fast scanning, the resulting rapid movement of the document sheet may cause its inaccurate alignment, and an error between the image captured by the scanning apparatus and the actual image of the document sheet may occur. In addition, the ADF is usually suitable with only paper document sheets, and is inoperative for thicker documents such as photos or cards.

Instead of designing an ADF that allows flipping the document sheet to scan both front and reverse sides with one single scan head, two scan heads may be mounted to respectively capture the images of the front and reverse sides of the document sheet. However, this solution is not satisfactory because the mount of two scan heads increases the production cost, and the coordination between the two scan heads further may be complex to achieve.

SUMMARY OF THE INVENTION

An aspect of the invention is therefore to provide a scanning apparatus that comprises a guiding structure by means of which the scanning module can slide and perform scanning of both front and reverse sides of a document sheet.

To accomplish the above and other objectives, a scanning apparatus of the invention comprises a scanning module that is slidably mounted to a guiding structure, and a scanning platform on which is placed a document sheet to be scanned. The guiding structure includes a first track portion and a second track portion that oppositely face the scanning platform, the first track portion being connected to the second track portion. Thereby, when the scanning module is located on the first track portion, it captures the image of the front side of the document sheet. When the scanning module is located on the second track portion, it captures the image of the reverse side of the document sheet. By a control of the slide and position of the scanning module on the guiding structure, the scanning module is further capable of performing image corrections before the scanning of the front and reverse sides is performed.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF THE PREFERRED EMBODIMENTS

Figure 1:
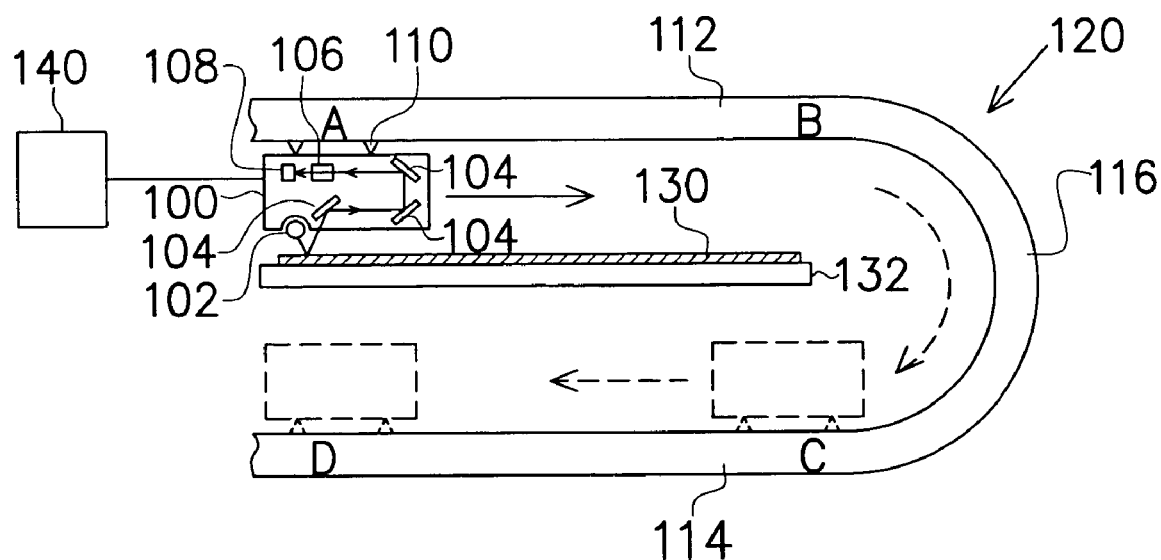
FIG. 1 is a schematic view illustrating a guiding structure of a scanning apparatus according to an embodiment of the invention.

The following detailed description of the embodiments and examples of the present invention with reference to the accompanying drawings is only illustrative and not limiting. Furthermore, wherever possible in the description, the same reference symbols will refer to similar elements and parts unless otherwise illustrated in the drawings.

Referring to FIG. 1, a schematic view illustrates a scanning module movement method according to an embodiment of the invention. As illustrated, a scanning module 100 typically comprises, for example, a light source 102, a reflective lens assembly 104, an objective lens 106, and an image sensor 108. The light source 102 is mounted outwardly on the scanning module 100 while the reflective lens assembly 104, the objective lens 106 and the image sensor 108 are respectively assembled inside the scanning module 100. The image sensor 108 is, for example, a charge coupled device (CCD) or a contact image sensor (CIS). As conventionally operated, the light source 102 projects an incident light on a document sheet 130 to be scanned, which produces an image light that travels through the reflective lens assembly 104 and the objective lens 106 to lastly form an image on the image sensor 108.

The scanning module 100 is mounted on a guiding structure 120. In this embodiment, the guiding structure 120 includes an upper track portion 112, a lower track portion 114, and a curved track portion 116 connecting the upper track portion 112 to the lower track portion 114 to form a generally U-shaped racetrack. The scanning module 100 is slidably mounted to the racetrack via slidable guiding assemblies 110, and is thereby capable of sliding back and forth along the U-shaped racetrack. The motion of the scanning module 100 is driven by means of a driving device 140 such as, for example, a stepper motor. The use of a stepper motor is particularly advantageous to accurately control the movement and positions of the scanning module 100 on the racetrack.

As illustrated in FIG. 1, the document sheet 130 is placed on a scanning platform 132, which may be, for example, a transparent flatbed that is mounted between the upper track portion 112 and the lower track portion 114. A front side and a reverse side of the document sheet 130, placed on the platform 132, therefore respectively face the upper track portion 112 and the lower track portion 114.

Figure 2:
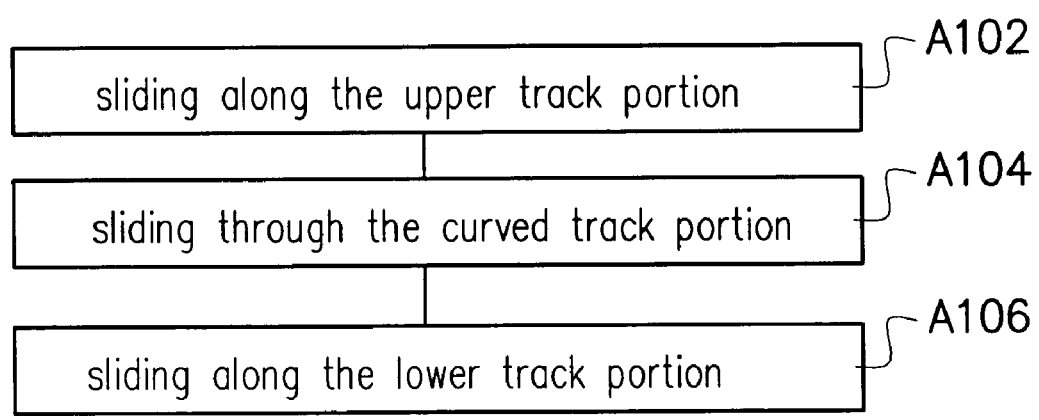
FIG. 2 is a schematic diagram illustrating a the slide of a scanning module along the guiding structure according to an embodiment of the invention.

Reference now is made to FIG. 1 and FIG. 2 to describe an operating movement of the scanning module according to an embodiment of the invention, FIG. 2 being a flow chart illustrating the different parts that compose the movement of the scanning module 100. As illustrated in FIG. 2, the movement of the scanning module 100 includes different stages referred to as A102, A104, and A106. At stage A102, the scanning module 100 slides along the upper track portion 112 from the point A to the point B (see FIG. 1), facing a front side of the document sheet 130. The scanning module 100 thereby captures the image of the front side of the document sheet 130. Via the curved track portion 116, the scanning module 100 is subsequently guided from the point B to the point C toward the lower track portion 114 at stage A104. At stage A106, the scanning module 100 slides along the lower track portion 114 from the point C to the point D, facing a reverse side of the document sheet 130. The scanning module 100 thereby captures the image of the reverse side of the document sheet 130.

With the above guiding structure, the scanning module is therefore capable of capturing the respective images of the front and reverse sides of the document sheet 130 via sliding along the racetrack. It will be understood that the motion of the scanning module 100 may be back and forth on the racetrack, adequately controlled by the driving device 140, to scan the document sheet 130.

Furthermore, an image correction operation of the scanning module may be performed at any of the points A, B, C, or D. For example, when the scanning module 100 is located at the point A of the upper track portion 112, an initial image correction may be performed. The scanning module 100 then scans the front side of the document sheet 130 while sliding to the point B. After having passed through the curved track portion 116 to the point C, the scanning module 100 performs another image correction. Thereafter, the scanning module 100 scans the reverse side of the document sheet 130 while sliding to the point D. The image correction therefore can be performed at the locations where scanning is started more than one time. These image corrections may be necessary to obtain optimal image quality if the depth of field varies due to a variation in distance between the document sheet 130 and the upper track portion 112 and between the document sheet 130 and the lower track portion 114.

Figure 3:
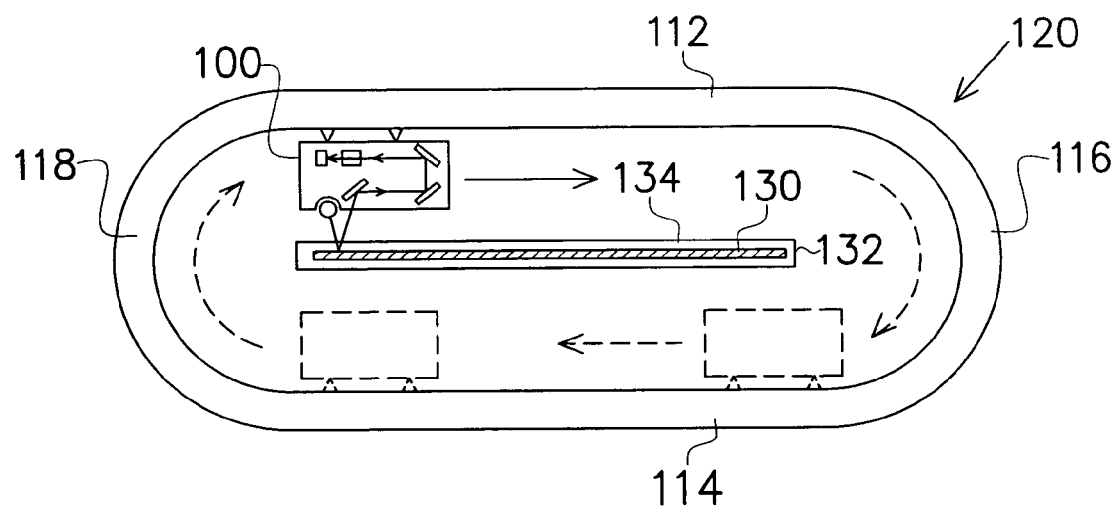
FIG. 3 is a schematic view illustrating a guiding structure according to another embodiment of the invention.

Referring to FIG. 3, a schematic view illustrates a guiding structure for a scanning module according to another embodiment of the invention. The guiding structure 120 of this embodiment slightly differs from that of the previous embodiment in that it includes an additional curved track portion 118 that closes the racetrack. The scanning module 100 thereby can slide cyclically along the guiding structure 120 to pass from the lower track portion 114 to the upper track portion 112 and vice-versa through either the curved track portion 116 or the curved track portion 118. The scanning platform 132 may be further provided with a clamping member 134 to fixedly position the document sheet 130.

Figure 3A:
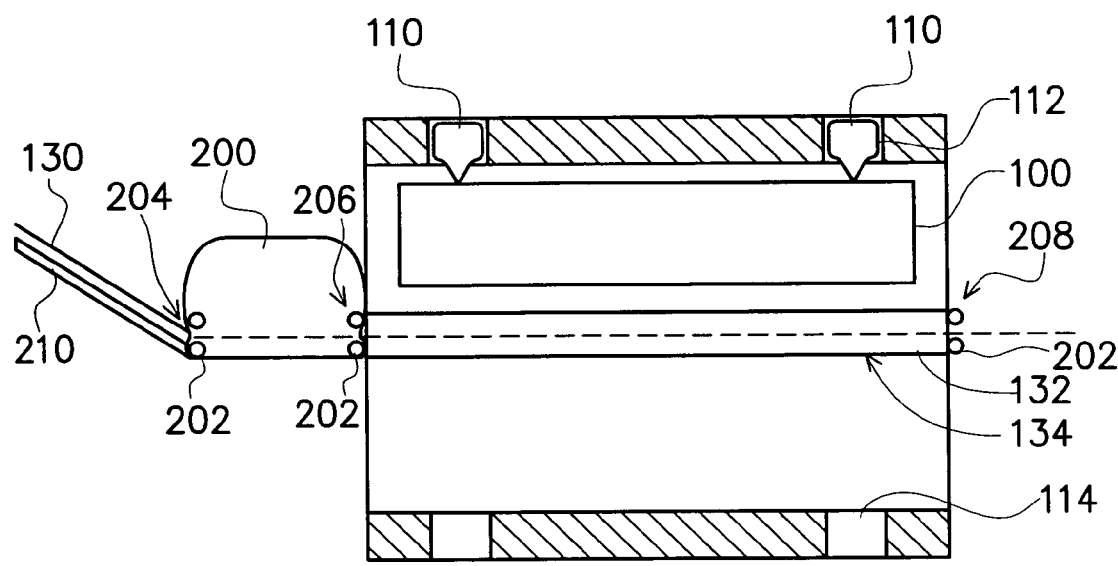
FIG. 3A is a schematic general view illustrating the guiding structure of the invention assembled in a scanning apparatus that is provided with an external automatic document feeder.

Referring to FIG. 3A, a schematic view illustrates the mount of the guiding structure of the invention in a scanning apparatus provided with an external automatic document feeder according to an embodiment of the invention. The automatic document feeder 200 is mounted at a first side of the scanning apparatus, and includes, for example, a plurality of pairs of rollers 202 respectively arranged at a sheet intake end 204, a sheet output end 206, and an opposite second side 208 of the scanning apparatus. At the sheet intake end 204 is further mounted a sheet tray 210, while a side of the scanning platform 132 is connected to the sheet output end 206.

Via the automatic document feeder 200, a document sheet 130 to be scanned, initially on the sheet tray 210, is fed into the scanning apparatus along a direction orthogonal to the sliding direction of the scanning module 100 to be placed on the scanning platform 132. The scanning module 100, sliding on the upper track portion 112, performs scanning of the front side of the document sheet 130. Passing through the curved track portion 118, the scanning module 100 then slides on the lower track portion 114 and performs scanning of the reverse side of the document sheet 130. Once the scanning of the front and reverse sides has been achieved, the scanned document sheet 130 is released along a direction orthogonal to the sliding direction of the scanning module 100 through the side 208 of the scanning apparatus. Meanwhile, another document sheet to be scanned can be fed in through the sheet intake end 204. The scanning of both front and reverse sides of a document sheet therefore advantageously does not require the flipping of the document sheet.

Figure 4A:
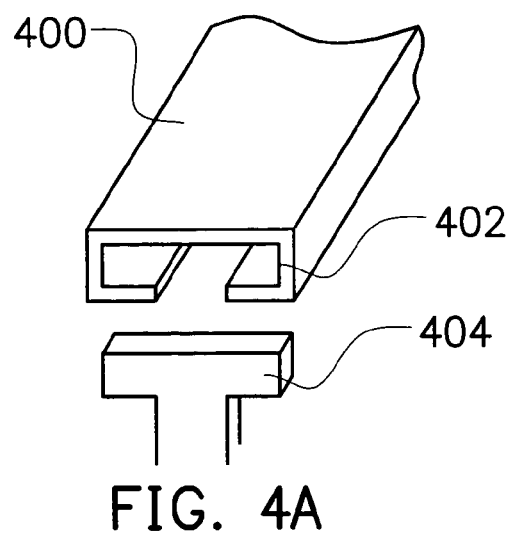
FIG. 4A~FIG. 4C are schematic views particularly illustrating the assembly of the scanning module with the guiding structure according to a variant embodiments of the invention.
Figure 4B:
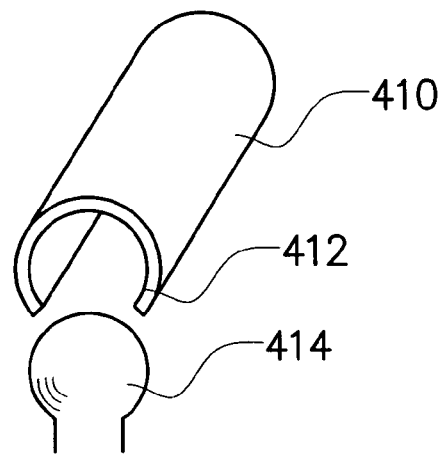
Figure 4C:
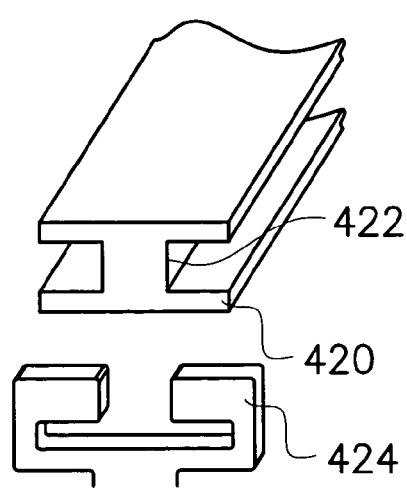

Now referring to FIG. 4A through FIG. 4C, several sectional views illustrate the guiding structure according to various embodiments of the invention. To enable a slidable mount of the scanning module 100, an engaging end of the scanning module 100 slidably assembles with the guiding structure 120. Several configurations of this assembly may be envisaged. FIG. 4A illustrates an example where the guiding structure 400 includes a longitudinal slot 402 in which one T-shaped engaging end 404, connected to the scanning module 100, slidably engages. FIG. 4B illustrates another example where the longitudinal slot 402 is replaced with a longitudinal and partially cylindrical cavity 412 in which slidably engages a spherical engaging end 414 of the scanning module. FIG. 4C illustrates another example where the racetrack is formed in an I-shape 422 with which matably engages a jaw-shaped end 424 of the scanning module 100.

As described above, by providing an adequate guiding structure, the scanning module therefore is capable of capturing the respective images of two opposite sides of the document sheet without the need to turn the document sheet. Furthermore, the invention enables an accurate driving of the slide of the scanning module along the racetrack. More particularly, the driving of the scanning module can be accurately controlled so as to enable an image correction before scanning of the front and reverse sides of the document sheet is started. Therefore, either a single side or both sides of the document sheet can be scanned with an optimal image quality.

It should be apparent to those skilled in the art that other structures that are obtained from various modifications and variations of different parts of the above-described structure of the invention would be possible without departing from the scope and spirit of the invention as illustrated herein. Therefore, the above description of embodiments and examples only illustrates specific ways of making and performing the invention that, consequently, should cover variations and modifications thereof, provided they fall within the inventive concepts as defined in the following claims.

What is claimed is:

1. An apparatus, comprising:
   a scanning platform to hold a document having a front side and a reverse side;
   a track having a first track portion and a second track portion that are configured to oppositely face the scanning platform; and
   a scanning module to slide along the track and capture images of the front and reverse sides of the document.

2. The apparatus of claim 1, wherein the track is formed with a U-shaped contour.

3. The apparatus of claim 1, wherein the track is formed with a closed contour around the scanning platform, along which the scanning module is capable of cyclically sliding.

4. The apparatus of claim 1, wherein the scanning module includes an engaging end that slidably engages with the track to achieve a slidable connection there between.

5. The apparatus of claim 1, wherein the engaging end of the scanning module is formed in a T-shape to slidably engage a longitudinal slot running along the track.

6. The apparatus of claim 1, wherein the engaging end of the scanning module is formed in a spherical shape to slidably engage a cylindrical cavity of the track.

7. The apparatus of claim 1, wherein the engaging end of the scanning module is formed in jaw-shaped engaging end that slidably engages with an I-shaped portion of the track.

8. A method comprising:
   driving a scanning module along a first portion of a path to scan a front side of a document on a scanning platform; and
   driving the scanning module along a second portion of the path to scan a reverse side of the document on the scanning platform, where the first portion of the path and the second portion of the path are configured to oppositely face the scanning platform.

9. The method of claim 8, wherein a first image correction is performed before the scanning module starts scanning of the front side of the document.

10. The method of claim 8, wherein a second image correction is performed before the scanning module starts scanning of the reverse side of the document.

11. The method of claim 8, further comprises feeding the document to the scanning platform in a direction orthogonal to a direction the scanning module is driven along the path.

12. The method of claim 8, further comprises releasing the document in a direction orthogonal to a direction the scanning apparatus is driven along the path.

13. A device comprising:
    a path having a first portion and a second portion that are configured to oppositely face a scanning platform configured to hold a document; and
    a scanning module to move along the path and capture one or more images of a front side of the document and a reverse side of the document.

14. The device of claim 13, wherein the path includes a third portion coupled between the first portion and the second portion, the third portion of the path having a contour that rotates the scanning module from facing the front side of the document to facing the reverse side of the document.

15. The device of claim 14, wherein the path includes a fourth portion coupled between the first portion and the second portion, the fourth portion of the path having a contour that rotates the scanning module from facing the reverse side of the document to facing the front side of the document.

16. The device of claim 13, further comprising a document feeder to provide the document to the scanning platform for scanning by the scanning module.

17. The device of claim 13, wherein the scanning module is configured to couple with the path.

18. The device of claim 17, wherein the scanning module includes a T-shaped member to engage a longitudinal slot running along the path.

19. The device of claim 17, wherein the scanning module includes a spherical shaped member to engage a cylindrical cavity of the path.

20. The device of claim 17, wherein the scanning module includes a member to engage with an I-shaped portion of the path.

* * * * *

UNITED STATES PATENT AND TRADEMARK OFFICE
CERTIFICATE OF CORRECTION

PATENT NO. : 7,518,767 B2
APPLICATION NO. : 10/695022
DATED : April 14, 2009
INVENTOR(S) : Shih-Huang Chen et al.

It is certified that error appears in the above-identified patent and that said Letters Patent is hereby corrected as shown below:

Column 5, line 30 (Claim 7):   Delete "in" and replace with --in a--.

Signed and Sealed this

Twenty-sixth Day of October, 2010

David J. Kappos
*Director of the United States Patent and Trademark Office*